United States Patent [19]

Michon et al.

[11] Patent Number: 4,483,587

[45] Date of Patent: Nov. 20, 1984

[54] SIGHTING AND AIMING ARRANGEMENT FOR USE DURING DAY OR NIGHT

[75] Inventors: Patrick Michon, Jouy en Josas; Jean-Marie Vauchy, Saint-Cloud, both of France

[73] Assignee: Societe de Fabrication d'Instruments de Mesure, Massy, France

[21] Appl. No.: 451,559

[22] Filed: Dec. 20, 1982

[30] Foreign Application Priority Data

Dec. 22, 1981 [FR] France ................. 81 23972

[51] Int. Cl.³ .................. G02B 27/14; H01J 31/50
[52] U.S. Cl. .................... 350/174; 350/618;
250/213 R; 356/153; 356/399
[58] Field of Search ............. 350/174, 301, 566, 538;
356/138, 153, 399, 400, 251, 252; 250/213 R

[56] References Cited

U.S. PATENT DOCUMENTS 3,936,137  2/1976  Litman ................. 356/252
4,108,551  8/1978  Weber ................. 350/301

Primary Examiner—John K. Corbin
Assistant Examiner—Paul Dzierzynski

Attorney, Agent, or Firm—Mason, Kolehmainen, Rathburn & Wyss

[57] ABSTRACT

The arrangement is of the type comprising: an optical sight (200) combined with an afocal opto-electronic unit (300).

According to the invention the opto-electronic unit is located in front of the entry window (210) of the optical sight and the light rays emitted by a reticle (250) are guided from the optical sight (ABC) thus passing through its entry window (210), then towards the exit window (320) of the opto-electronic unit (CDEFG) in order to make the rays emitted by the reticle follow the same optical path (GHIJ) as the rays emitted by the object to be observed (400).

The angular deviations produced by the addition of the opto-electronic unit are thus compensated for.

In order to measure the magnification produced by this addition, the reticle (251,251') is split by a known value (1) the distance (1') between the images of this split reticle is then measured by a row of diodes (280), (FIG. 2).

10 Claims, 2 Drawing Figures

U.S. Patent    Nov. 20, 1984    4,483,587
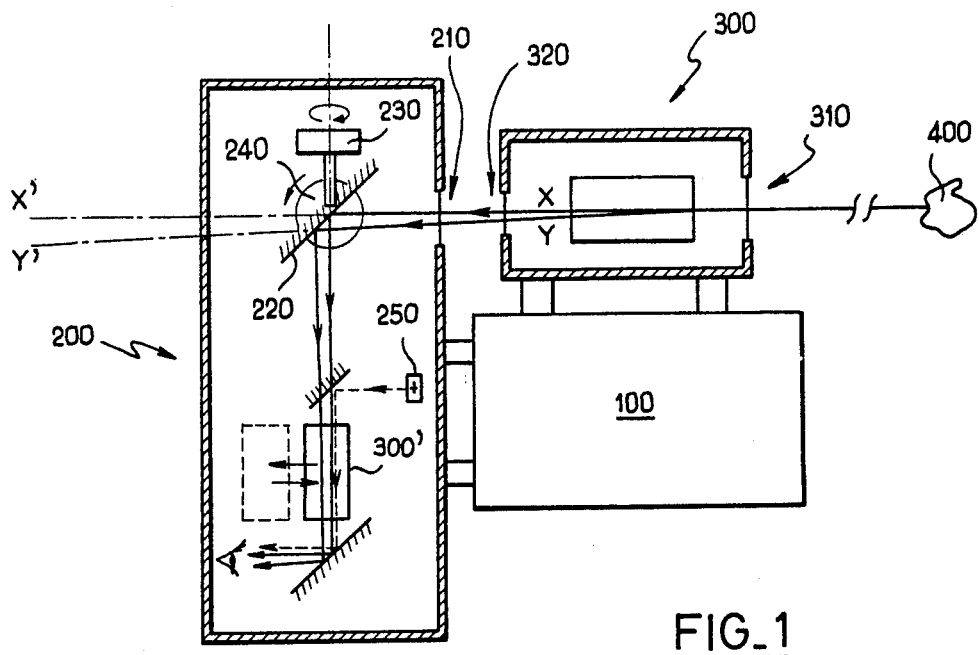
FIG_1
PRIOR ART
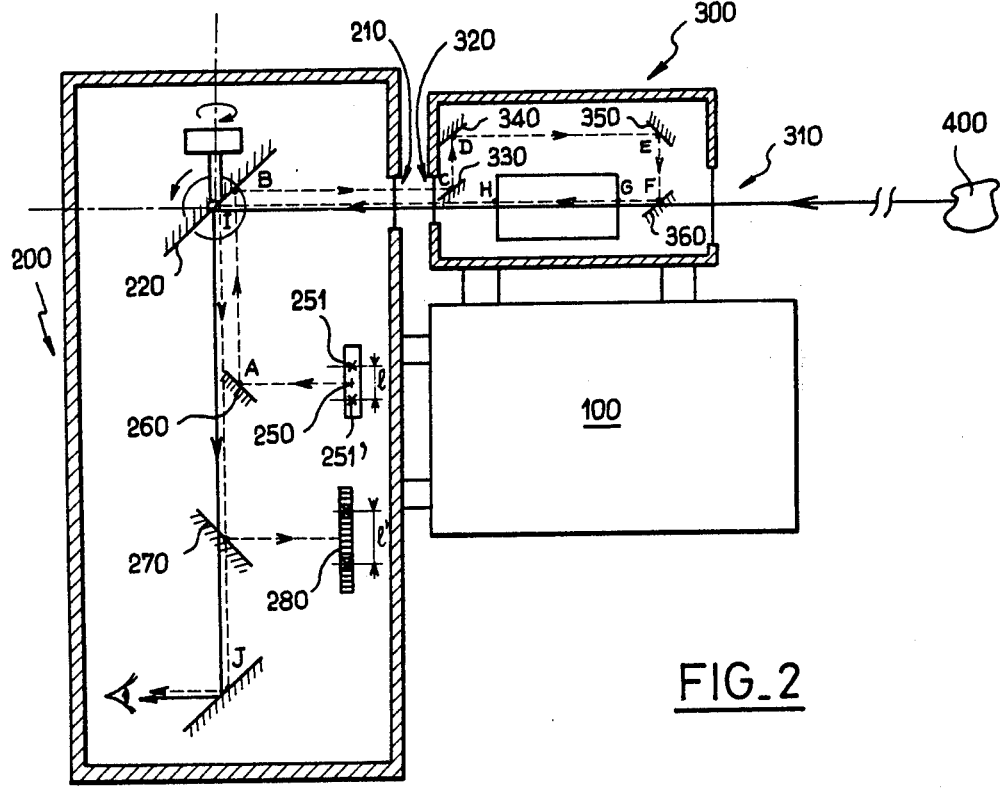
FIG_2

SIGHTING AND AIMING ARRANGEMENT FOR USE DURING DAY OR NIGHT

The present invention relates to a sighting and aiming arrangement, using in combination an optical sight, such as for example a panoramic periscopic sight or an observation telescope and an afocal, opto-electronic unit, such as a light intensifier or a converter for converting thermal radiation (infrared) into visible radiation. An optical unit of this type makes it possible to transform an optical image, of visible or infrared light, into electrical signals which are processed in a suitable manner and serve to form a new visible optical image by scanning of a beam of electrons. The addition of such a device to a conventional optical sight allows night sighting, or day sighting with increased possibilities. This opto-electronic unit will be referred to hereafter as a "night module".

However, the addition of a night module has the drawback of introducing a deformation of the image. This deformation may be either an angular deviation or a deviation of position of the emergent optical axis of the night module with respect to its incident optical axis, or a scale effect, the magnification provided by the night module not being strictly equal to 1.

These distortions are due to the fact that the optical image is transformed into a beam of electrons, the precision of which is affected by numerous factors: stability of the supply voltages, drift of the components, magnetic effects due to the earths field, to the metal ground of the carrying vehicle, to the electrical circuits operating in the latter, vibrations, . . . . It is generally difficult to recognize and compensate the influences of these factors. In addition, they are permanently variable.

In any case, it is impossible to achieve the very high aiming accuracy obtained with a purely optical arrangement, of the order of ten arc seconds—limited solely by technological constraints of machining and assembly of the optical components and of the associated mechanical parts.

A value of this scale, which corresponds to an accuracy of the order of 20 to 30 cm over a distance of 2000 m, should however be achieved if one wishes to use the arrangement not only for observation, but also for aiming at targets.

It has already been proposed to equip the optical device with an internal light source forming a cross-hair reticle and to direct the light rays emitted by this reticle towards the operators eye. The night module is thus located at the end of the optical path common to the rays emitted by the reticle and to the rays emitted by the object sighted, just in front of the observation position. The reticle image is thus deformed in the same way as that of the target.

If this solution is satisfactory on a theoretical level, it nevertheless encounters difficulties when being put into operation: the fact of integrating the night module in the sight makes it necessary to choose a module of reduced dimensions, thus with lower performances. Furthermore, it is necessary to provide an internal mechanism for moving the module, if one wishes to withdraw the latter from the path of the light rays in order to return to day sighting, i.e. purely optical sighting. The difficulties of exchanging and maintaining the night module, which is always fragile, are also to be considered.

The object of the present invention is not to provide an integrated day/night sight of this type, but to combine a night module with a day sight of conventional type, the two members being connected to each other in such a way that they can be separated. For night sighting, the night module is adapted in the manner described hereafter. For day sighting, the night module is purely and simply withdrawn, for example by manual dismantling, thus preventing exposing it to external risks. It is obvious that exchanging a faulty module will take place without difficulty, since the adaptation according to the invention requires no special adequation between the optical sight and the night module: there is complete interchangeability. The size of the night module is no longer a constraint, since it is now outside the sight.

A sighting and aiming arrangement of this type is particularly suitable for the mechanical structure described in French Patent Application No. 81 13138, filed in the name of Applicant and entitled "Protected periscopic sight" and which will be considered as included in the present description due to the reference which is made thereto.

According to the present invention there is provided a sighting and aiming arrangement, of the type comprising:

an optical sighting device, comprising an entry window and comprising a source of visible light forming a reticle, an afocal opto-electronic unit, comprising an entry window and an eyepiece window and connected to the sighting device so that it can be separated, a common structure supporting the optical sighting device and the opto-electronic unit, characterised in that:

the eyepiece window of the opto-electronic unit is located in front of the entry window of the optical sighting device, the entry window of the opto-electronic unit being orientated in the direction of the object sighted, and in that the light rays emitted by the reticle are guided outside the optical sighting device by passing through its entry window, then towards the entry window of the opto-electronic unit, the rays leaving the optical sighting device and entering the opto-electronic unit being parallel, in order to cause these rays emitted by the reticle to follow the same optical path as the rays emitted by the object sighted.

With the arrangement of the present invention, it is possible to provide one of the sighting windows in the protective cover with a night module, which is thus integral with this cover and may itself be protected in a suitable manner without any limitation as regards weight or dimensions. All the advantages described in the above-mentioned patent are again present, with the possibility of combining any type of night module with any type of optical sight.

Owing to the fact that the position of the cover is controlled with respect to the sight head and owing to the assembly of the sight/structure/cover/module arrangement, which is not of a metrological nature, there is always a slight misalignment between the entry focal optical axis of the sight and the exit focal optical axis of the night module. The invention makes it possible to obviate this drawback.

To this end, the light rays emitted by the reticle are directed outside the sight thus passing through its entry window, then towards the entry window of the night module, the rays leaving the sight and entering the night module being parallel, in order to make these rays emitted by the reticle follow the same optical path as the rays emitted by the object to be observed.

In this way, it is sufficient to place the exit window of the night module approximately opposite the entry window of the sight in order to obtain an image allowing accurate aiming: the reticle is in fact deflected in the same manner as the optical rays coming from the object to be observed and this correction is permanent, even in the case of instantaneous modification of the opto-electronic image (voltage drop, movement of a metal ground, . . . ) or a change in the alignment of the sight and of the module (for example during rotation of the slaved cover).

On the other hand, the removal of the night module (for example by angular shifting of the cover placing an optically neutral window opposite the sighting axis of the head of the sight) or conversely, its introduction, in no way modifies the accuracy of the preceding adjustment.

The rays omitted by the reticle are directed from the entry window of the sight towards the entry window of the night module through a series of prisms or mirrors, then by a semi-reflecting mirror, or an opaque mirror of small dimensions, placed in front of the latter objective lens.

In order to compensate for variations of scale, it is possible to provide the arrangement according to the invention with a split reticle emitting two parallel rays separated by a predetermined spacing, the two images being received at the end of their optical path by a device for measuring the spacing of these two images, in order to determine the magnification introduced by the night module. This value, converted into electrical signals, will make it possible to compensate exactly for the rough angular values noted.

This last feature is particularly interesting when the cross-hairs are used as a sight stadia reticle, i.e. for measuring the angular position of a target which is not at the centre of the reticle, each graduation on the reticle corresponding to a given angular unit. Given the distance of the target, it is also possible to determine its dimensions by these means. The split reticle defined in the invention will provide the correction factor to be applied to the measured value. This correction may also be made automatically by correcting the electrical information supplied by the angular coders, by means of a computer.

The single reticle is an aiming reticle; it is emitted in visible light.

The split reticle may exist simultaneously or alternately with the single reticle. It may be emitted in visible light. In the latter case, the wave length will be chosen in such a way that the radiation is transmitted by the night module and that it is comprised in the area of sensitivity of the opto diodes. In addition, one could advantageously pick up and separate the split image by means of a dichroic mirror, which will not affect the visible image transmitted to the operator and will prevent it from striking the diodes.

Further features and advantages of the invention will become apparent on reading the ensuing detailed description, made with reference to the accompanying drawings in which:

FIG. 1 illustrates the solutions of the previous technology;

FIG. 2 is a schematic diagram of the arrangement defined in the invention.

FIG. 1 shows an arrangement of conventional type: a common support structure shown diagrammatically by the reference 100 is connected to an optical sighting arrangement 200 and an afocal, opto-electronic unit 300.

The optical arrangement 200 comprises an entry window 210 and comprises, for example in the case of a panoramic periscopic sight, a return mirror 220, which is able to rotate, returning the image to a fixed observation position located in the lower section. Angular coders 220 and 230 measure the movement of the mirror.

The sensor 230 measures the azimuth angle; sensor 240 measures the elevation angle. The arrangement is preferably stabilized gyroscopically in order to prevent vibrations from confusing the measurements.

Reticle 250 emits light rays which are returned to the observation station, in order to superimpose the reticle image on the image of the sighted object 400.

The operator moves the mirror 220 as regards inclination and azimuth until the image of the target 400, situated in the scanned field observed, is located at the centre of the reticle. Sensors 230 and 240 then indicate the direction of this target.

The opto-electronic unit comprises an entry window 310 and an exit window 320. The exit window 320 is aligned in the optimum manner with exit window 210 of the optical sighting device.

However, this alignment is never perfect. It follows that the emergent optical axis YY' is offset with respect to the incident optical axis XX' of the sighting device. The image perceived by the observer will thus be slightly offset and the latter must compensate for this shift by an angular displacement of the mirror, which will falsify the values measured by the sensors 230 and 240.

One variation, which eliminates this error, consists in placing night module 300 no longer in front of the entry window 210 of the optical sight, but of integrating it with this window, in the position bearing the reference 300', at the end of the optical path, in the vicinity of the observation position. In this way, the recticle image also passes through the night module and compensates for defects produced by the latter. A suitable mechanical device makes it possible to withdraw the night module 300' from the path of light rays for day sighting.

The drawbacks of this variation comprising an integrated night module were discussed above, these drawbacks being inherent in particular in the lack of space available inside the optical sighting device 200.

In the sighting arrangement defined in the invention, illustrated in FIG. 2 (where the same references as those of FIG. 1 refer to the same components), the rays emitted by the reticle 250 are first of all reflected, at the point A, by a first mirror 260 towards the movable return mirror 220—which is the same as that serving to return the image of the target 400. Reflected on this mirror at B, the image leaves the optical sighting device through its entry window 210.

It then enters the exit window 320 of the night module, where it is guided in order to be re-injected towards the entry window of the night module (path CDEFG of the light rays). The light rays may be guided by a series of prisms or mirrors 330,340,350, then by a semi-reflecting mirror 360, also located in the path of the light rays coming from the target 400. In place of the semi-reflecting mirror 360, it is also possible to use an opaque mirror of small diameter, which will cut off only a very small part of the field (in the manner of certain reflecting telescopes).

The optical path indicated between the points B and G is given solely by way of example, numerous variations being possible. The essential point is that the rays BC (leaving the entry window of the optical device) and FG (entering the entry window of the night module) are parallel. Apart from this condition, any other optical combination would produce the same result.

At the same time as the light rays emitted by the source 400, the rays emitted by the reticle now pass through the night module proper (GH), return to the optical device (HI) and are reflected a second time by the mirror 220, which returns them to the observation position (IJ).

In order to compensate for the scale effect produced by the opto-electronic unit, it is possible to provide a split reticle 251,251' emitting two parallel rays separated by a predetermined spacing 1 and following the same optical path as the single reticle 250.

The source of radiation may be visible light or, preferably, invisible light (of the order of 0.9 to 1 micron wave length).

At the end of the optical path, the split image is reflected by a mirror 270 (a semi-reflecting mirror or, in the case of invisible light, a dichroic mirror), which returns it towards a row of diodes 280 serving to measure the distance 1' between the two emergent rays. The ratio 1/1' calculated for example by a microprocessor, will determine the scale factor applicable to the angular measurements made by the optical sight through the opto-electronic unit, in order to correct these measurements or for purposes of stabilization.

Naturally, the particular design described above is in no way limiting and numerous variations of the invention may be envisaged in accordance with its spirit.

What is claimed is:

1. A sighting and aiming arrangement, of the type comprising:
   an optical sighting device comprising an entry window and comprising a source of visible light forming a reticle,
   an afocal opto-electronic unit for night vision, comprising an entry window and an eyepiece window and connected to the sighting device so that it can be separated,
   a common structure supporting the optical sighting device and the opto-electronic unit, characterized in that:
   the eyepiece window of the opto-electronic unit is located in front of the entry window of the optical sighting device, the entry window of the opto-electronic unit being orientated in the direction of the object sighted,
   and in that reflecting and quiding means are provided in order to guide light rays emitted by the reticle to leave the optical sighting device by passing through the entry window of the optical sighting device then by-pass the opto-electronic unit toward the entry window of the opto-electronic unit, the path of the rays leaving the optical sighting device being parallel to the path of the rays entering the opto-electronic unit, in order to cause said rays emitted by the reticle to enter the entry window of the afocal opto-electronic unit together with the rays emitted by the object sighted,
   whereby both rays will follow the same further optical path into the afocal opto-electronic unit.

2. An arrangement according to claim 1, characterized in that the reflecting and guiding means include a semi-reflecting mirror located in front of the entry window of the opto-electronic unit.

3. An arrangement according to claim 1, characterized in that the reflecting and guiding means include an opaque mirror of small dimensions located in front of the entry window of the opto-electronic unit.

4. An arrangement according to claim 1, characterized in that reflecting and guiding means include a series of prisms.

5. An arrangement according to claim 1 characterized in that it comprises a split reticle emitting two parallel rays separated by a predetermined spacing and in that the two images are received at the end of their optical path, by means for measuring the distance between these two images, in order to determine the magnification introduced by the opto-electronic unit.

6. An arrangement according to claim 5, characterized in that the images of the split reticle are returned to the device for measuring their separation by means of a semi-reflecting mirror.

7. An arrangement according to claim 5, characterized in that the split reticle emits rays of invisible light and in that the images from this split reticle are returned to the device for measuring their separation by means of a dichroic mirror.

8. An arrangement according to claim 1, characterized in that the optical sighting device is a telescopic sight with a rotating mirror and in that the rays emitted by the reticle are reflected firstly by this mirror before leaving through the entry window of the sight and are reflected secondly by this same mirror after having passed through the opto-electronic unit.

9. An arrangement according to claim 1, characterized in that the opto-electronic unit is a light intensifier.

10. An arrangement according to claim 1, characterized in that the opto-electronic unit is a convertor for converting thermal radiation into visible radiation.

* * * * *